(12) United States Patent
Crawford

(10) Patent No.: US 8,091,375 B2
(45) Date of Patent: Jan. 10, 2012

(54) HUMIDITY CONTROL FOR AIR CONDITIONING SYSTEM

(75) Inventor: Roy R. Crawford, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 1035 days.

(21) Appl. No.: 11/431,728

(22) Filed: May 10, 2006

(65) Prior Publication Data

US 2007/0261422 A1 Nov. 15, 2007

(51) Int. Cl.
*F25D 17/06* (2006.01)
*F25D 17/04* (2006.01)
*F25B 49/00* (2006.01)

(52) U.S. Cl. .............. 62/161; 62/176.1; 62/162; 62/186

(58) Field of Classification Search ................ 62/176.1, 62/158, 157, 178, 180; 236/44 A, 44 C
See application file for complete search history.

(56) References Cited

U.S. PATENT DOCUMENTS

| | | | |
|---|---|---|---|
| 212,653 A * | 2/1879 | Bradford | 236/44 A |
| 2,525,342 A * | 10/1950 | Frie | 62/275 |
| 3,195,554 A * | 7/1965 | Hanna | 137/88 |
| 3,525,385 A * | 8/1970 | Liebert | 165/50 |
| 3,585,811 A * | 6/1971 | Friedel | 62/173 |
| 4,642,770 A * | 2/1987 | Shirley | 701/36 |
| 4,645,908 A * | 2/1987 | Jones | 392/340 |
| 4,685,307 A * | 8/1987 | Jones | 62/160 |
| 4,735,054 A * | 4/1988 | Beckey | 62/93 |
| 4,809,516 A * | 3/1989 | Jones | 62/160 |
| 4,869,073 A * | 9/1989 | Kawai et al. | 62/160 |
| 5,094,089 A * | 3/1992 | Lail | 62/429 |
| 5,129,234 A * | 7/1992 | Alford | 62/176.6 |
| 5,129,234 A | 7/1992 | Alford | |
| 5,146,764 A * | 9/1992 | Bauman et al. | 62/228.5 |
| 5,165,249 A * | 11/1992 | Thompson | 62/156 |
| 5,345,966 A * | 9/1994 | Dudley | 137/601.08 |
| 5,351,855 A | 10/1994 | Nelson et al. | |
| 5,485,953 A * | 1/1996 | Bassett et al. | 236/49.3 |
| 5,534,854 A * | 7/1996 | Bradbury et al. | 340/648 |

(Continued)

FOREIGN PATENT DOCUMENTS

JP 2000179903 A * 6/2000

OTHER PUBLICATIONS

Restaurants cite switch to programmable thermostats Dunbar, Mark Energy user news, v14, n3, p. 15(3) Apr. 1989 summary/abstract.*

*Primary Examiner* — Judy Swann
*Assistant Examiner* — Alexis Cox
(74) *Attorney, Agent, or Firm* — Conley Rose, P.C.; J. Robert Brown, Jr.

(57) ABSTRACT

In an air conditioning system for circulating cooled air to an enclosed space, a controller including a temperature sensor, a humidity sensor and a microcontroller for controlling the indoor fan or blower to prevent operation of same if a fan run-on mode is selected or continuous fan operation is selected and the humidity sensed in the enclosed space is greater than a predetermined amount. Continuous fan operation is allowed unless the humidity exceeds a user defined setpoint during an air cooling operating mode. If the humidity sensed is greater than the predetermined amount, the fan is operated only when the system is providing cooled air, such as when the system compressor is energized.

5 Claims, 3 Drawing Sheets

U.S. PATENT DOCUMENTS

| | | | |
|---|---|---|---|
| 5,746,650 A * | 5/1998 | Johnson et al. | 454/52 |
| 5,810,244 A | 9/1998 | Ngai | |
| 5,810,244 A * | 9/1998 | Ngai | 236/44 C |
| 5,813,235 A * | 9/1998 | Peterson | 62/6 |
| 5,946,923 A * | 9/1999 | Samukawa et al. | 62/133 |
| 5,977,733 A * | 11/1999 | Chen | 318/434 |
| 6,070,110 A | 5/2000 | Shah et al. | |
| 6,223,543 B1 | 5/2001 | Sandelman | |
| 6,487,868 B2 * | 12/2002 | Sato et al. | 62/176.1 |
| 6,622,925 B2 * | 9/2003 | Carner et al. | 236/46 R |
| 7,574,871 B2 * | 8/2009 | Bloemer et al. | 62/176.6 |
| 7,740,184 B2 * | 6/2010 | Schnell et al. | 236/44 C |
| 7,765,816 B2 * | 8/2010 | Okaza et al. | 62/158 |
| 2005/0115258 A1 * | 6/2005 | Violand et al. | 62/186 |
| 2008/0141996 A1 * | 6/2008 | Erdmann | 126/299 D |
| 2009/0134232 A1 * | 5/2009 | Larsen | 236/44 C |
| 2009/0143879 A1 * | 6/2009 | Amundson et al. | 700/83 |
| 2009/0210095 A1 * | 8/2009 | Bush et al. | 700/277 |
| 2010/0127089 A1 * | 5/2010 | Sakami | 236/44 C |
| 2010/0170280 A1 * | 7/2010 | Narikawa et al. | 62/271 |
| 2010/0170292 A1 * | 7/2010 | Narikawa et al. | 62/476 |
| 2010/0217441 A1 * | 8/2010 | Eichman | 700/275 |
| 2011/0056384 A1 * | 3/2011 | Kadota | 96/407 |

* cited by examiner

HUMIDITY CONTROL FOR AIR CONDITIONING SYSTEM

BACKGROUND OF THE INVENTION

In the art of heating, ventilating and air conditioning (HVAC) equipment, there has been a continuing need and desire to provide a system and method for controlling air flow to and from an enclosed space wherein the humidity level is controlled to the desires of the occupants of the space. In this regard controls have been developed which include a humidity sensor and an associated controller providing for adding moisture to the air flow stream or reducing the humidity level by over cooling and reheating the air, for example, and by operation of humidity providing or dehumidification processes and equipment.

However, a common problem in the art of forced air flow air conditioning or so-called cooling equipment, in particular, is control of the indoor air circulating fan or blower to avoid evaporation of condensate collecting on the cooling coil or heat exchanger and in any condensate collecting pans which may be interposed in the air flow stream. In other words, in many air conditioning control schemes, the indoor fan operation cycle may reintroduce moisture into the air flowstream that has been extracted during a cooling cycle of operation if the fan, for example, operates in accordance with a delayed shut-off control scheme or if the fan is operated in a continuous "on" mode. Accordingly, there has been a need for a process and equipment wherein the humidity level in the enclosed space being controlled can be more precisely monitored and controlled to avoid inadvertent or unwanted increase in the humidity of the controlled space. It is to these ends that the present invention has been developed.

SUMMARY OF THE INVENTION

The present invention provides an improved method for controlling humidity in an enclosed space being served by an air conditioning system. The invention also comprises an improved system for controlling the humidity being sensed in an enclosed space to avoid an increase in humidity as a consequence of continued operation of an indoor air circulating fan or blower.

In accordance with one aspect of the invention, a method is provided for operating a circulating fan for an air conditioning system only if the sensed humidity in the enclosed space is below a predetermined setpoint. The fan is enabled only if the humidity is below a certain percentage of the setpoint humidity level, for example. If the humidity sensed is above a certain predetermined value any delay in turning the fan off after a cooling call is satisfied is disabled and if a continuous fan operating mode has been selected this mode is also disabled.

In accordance with a further aspect of the invention, a method of operating a forced air circulation air conditioning system is provided for controlling the humidity in an enclosed space being served by the system wherein, in a call for cooling air within the enclosed space, an air circulating fan is operated according to the cooling call and, upon termination of the requirement for cooling air flow, humidity in the space is sensed and if the humidity is above a predetermined setpoint, the fan is operated only according to a cooling call process and is otherwise disabled.

Still further, the present invention provides an air conditioning unit including a control system having a humidity sensor and a microprocessor which is programmed to prevent operation of the indoor air circulating fan if the humidity level sensed within the enclosed space is above a selected setpoint. In particular, operation or disablement of the air circulating fan is controlled in accordance with a humidity level which is a predetermined percentage of the humidity setpoint.

Those skilled in the art will further appreciate the above-mentioned advantages and features of the invention together with other important aspects thereof upon reading the detailed description which follows in conjunction with the drawings.

DETAILED DESCRIPTION OF THE PREFERRED EMBODIMENTS

Figure 1:
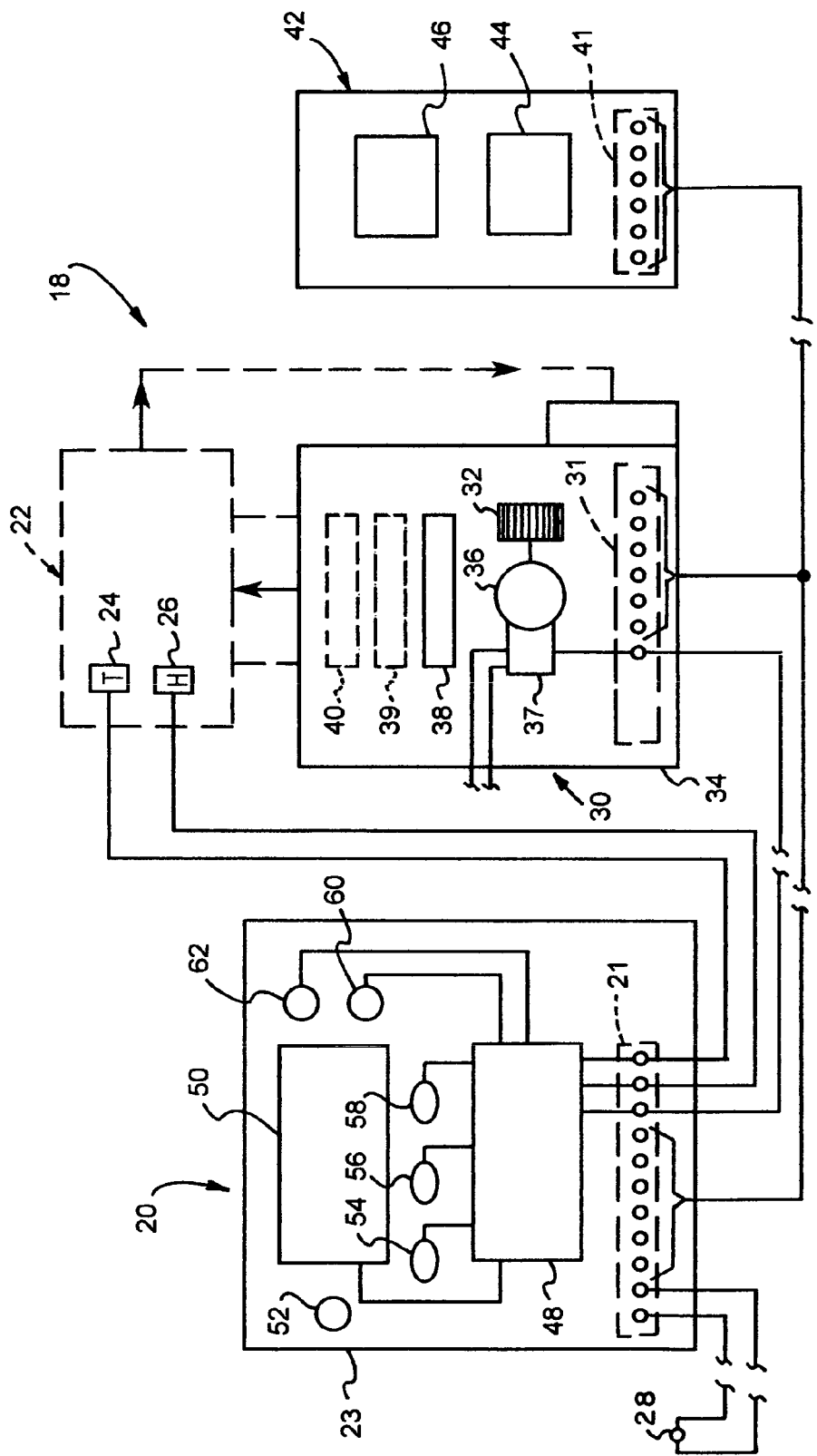
FIG. 1 is schematic diagram of an HVAC system including a controller for the system operable in accordance with a method of the present invention.

In the description which follows like elements are marked throughout the specification and drawing with the same reference numerals, respectively. The drawing figures are not necessarily to scale and certain features may be shown exaggerated in scale or in somewhat schematic or generalized form in the interest of clarity and conciseness.

Referring to FIG. 1, there is illustrated a schematic diagram an HVAC system 18 which includes a thermostat generally designated by the numeral 20. The thermostat 20 includes certain sensors for sensing the temperature of an enclosed space 22 including a temperature sensor 24 and also a humidity sensor 26 for sensing the relative humidity in the space 22. The thermostat controller 20 may also include a temperature sensor 28 for sensing the so-called outdoor temperature surrounding the enclosed space 22. Enclosed space 22 may be a private residential dwelling or one or more rooms or spaces in a commercial building, for example. The temperature and humidity of the air within the enclosed space 22 is controlled by HVAC system 18 which comprises an indoor unit 30 including a forced air flow fan or blower 32 disposed within a suitable cabinet 34 and operable to be driven by an electric motor 36, for example, for circulating air to and from the enclosed space in a conventional manner. Motor 36 is operably connected to a source of electrical power by way of a control unit 37 operably connected to thermostat 20.

The so-called indoor unit 30 of HVAC system 18 may include one or more heat exchangers 38, 39 and 40 arranged in series or parallel with respect to air flow through the cabinet 34. Typically, the heat exchangers 38, 39 and 40 may comprise so-called cooling or evaporator coils through which chilled fluids are circulated to effect cooling of air flowing thereover and being displaced by fan or blower 32 to enclosed space 22. This operation typically results in condensation of water vapor in the air flowstream, which condensation collects on the heat exchangers 38, 39 and 40 and may be sufficient to drain into a collection pan or pans, not shown, in a conventional manner. However, in the operation of HVAC equipment, particularly in the so-called air cooling mode, a substantial amount of condensed water vapor may collect and remain on the surfaces of the heat exchangers 38, 39 and/or 40 after a cooling call is satisfied but also during operation of blower 32 and this condensed moisture may re-evaporate and enter the enclosed space 22 thereby raising the humidity level above that which is desired.

The HVAC system 18 also includes a so-called outdoor unit 42 which may include one or more vapor compression compressor units 44 and 46. Outdoor unit 42 may also include conventional condenser heat exchangers, not shown, operably connected to the heat exchangers 38, 39 and/or 40 thereby making up a conventional single or multistage vapor compression air conditioning or heat pump system. The thermostat controller 20, indoor unit 30 and outdoor unit 42 are operably interconnected by way of respective electrical conductor terminal strips 21, 31 and 41 whereby control signals may be transmitted to and from the thermostat type controller unit 20 for controlling operation of motor 36 and associated control components normally found in an HVAC system.

Figure 2:
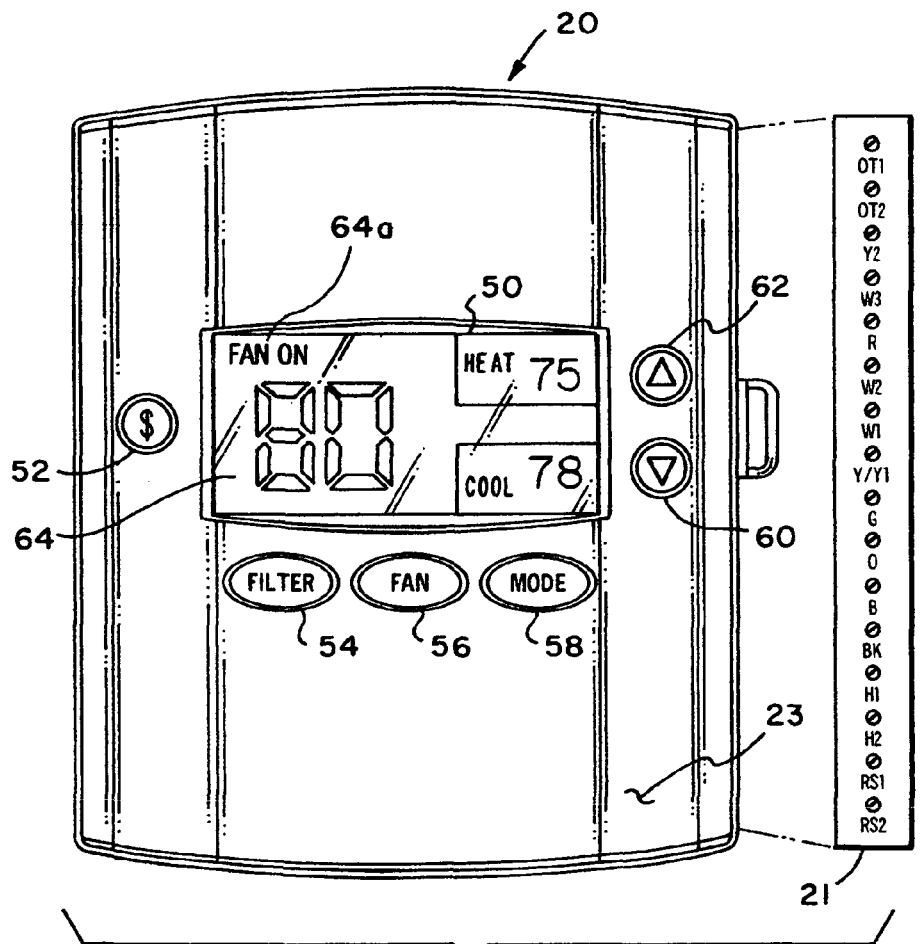
FIG. 2 is a front elevation of a thermostat type controller used in the system illustrated in FIG. 1 and for use with a method of the present invention.

Referring further to FIG. 1 and also FIG. 2, the thermostat or controller 20 includes a suitable housing 23 in which is disposed a microcontroller 48 operably connected to a visual display 50 and to respective user controlled pushbutton switch actuators 52, 54, 56, 58, 60 and 62. Display 50 is operable to display various indicia, such as indicated in FIG. 2, including the actual sensed temperature 64 within space 22 or alternatively, the setpoint for temperatures and for a selected relative humidity, for example. The actual humidity condition being sensed by the sensor 26, for example, may also be selectively displayed for the thermostat user. Switch actuator 52 may be utilized to cause the controller 48 to operate in a default mode or a temperature setback mode for energy savings. As indicated in FIG. 2, the switch actuator 54 may be used to display the remaining prescribed life of a system air filter. Actuator 56 may be used to control fan or blower 32 to operate in a continuous mode or only in response to operation of compressor units 44 or 46, for example, and actuator 58 may be used to control the mode of operation either a heating mode, for a heat pump system, or a cooling mode only, for example. Actuator 58 may also be used to display and set the humidity level in space 22. Switch actuators 60 and 62 may be utilized to decrease or increase, respectively, particular values of parameters being set by the controller 20 and displayed on the display 50, including, the desired relative humidity within the enclosed space 22.

Figure 3:
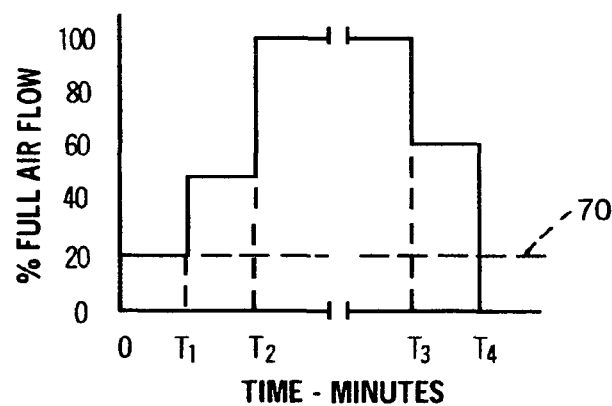
FIG. 3 is a diagram illustrating a typical example of an air flow profile produced by a fan for circulating air within an enclosed space and in accordance with the system and method of the present invention.

Referring briefly to FIG. 3, as previously mentioned, the HVAC system 18 may be set or its operation modified by the controller 20 to provide a signal to control unit 37 for fan motor 36 to operate at a certain "profile" of circulation of air within the space 22 at selected air flow rates. The user of the system 18 may set operation of the blower 32 to operate in a so-called continuous mode at a selected or predetermined percentage of full air flowrate during periods when there is no call to the system 18 for cooling, for example. The continuous air flowrate may be selected to be a particular percent of full air flowrate, such as 20%, for example. Such an air flowrate is illustrated in the diagram of FIG. 3 as presented by the line 70. The diagram of FIG. 3 also shows percent full air flow on the vertical scale and time in minutes, for example, on the horizontal scale. Zero time is that at which a call for cooling is provided at the controller 20 due to correlation between the setpoint temperature for the cooling effect input by the user of the controller 20 and the temperature sensed by the sensor 24. The system 18 may, for example, be controlled by the microcontroller 48 to operate motor 36 to provide a predetermined percent of full air flow for a predetermined time period at the time of energization or start-up of the system to minimize the sensed temperature of the air flowing due to cooling or heating of the air in the system air flow delivery ducting where stratification of the air may occur within such ducting or within the space 22, for example. The system 18 may also be set to a predetermined air flow rate by selecting a reduced speed of the blower 32 after the call for cooling is satisfied at time $T_3$, for example by providing for so-called blower run-on or a turn-off cycle at a reduced air flowrate of, for example, 50% to 65% of maximum, as also shown in FIG. 3. Air will be circulated at this percentage of full air flow rate for a period of time between times $T_3$ and $T_4$ in FIG. 3 and at time $T_4$ motor 36 is de-energized or may be operated continuously at, for example, the 20% full air flow rate, as indicated by line 70, if that mode of operation has been selected by the user of the system 18.

Accordingly, the system 18 may be operated at various blower or fan turn-off delay times or fan off delay periods as compared with operation at full or 100% air flowrate. The system 18 may also be operated in accordance with the method described and claimed in U.S. patent application Ser. No. 11/265,049 by Carl L. Garrett, et al., filed on Nov. 2, 2005 and assigned to the assignee of the present invention.

Thus, those skilled in the art will appreciate that the system 18 may be operated at various blower shut down time delays or so-called fan or blower off delay periods at a specific percent of full air flow. However, as mentioned previously, if the blower is operated continuously or for a predetermined time after an air cooling call has been satisfied by the system 18, condensed water vapor on the heat exchangers 38, 39 and/or 40 or within the aforementioned condensate collection pans, may be re-evaporated and circulated into the space 22 thereby raising the humidity level above that which is desired by the users or occupants of the space 22.

In establishing an operating profile for the system 18 according to the present invention, a user of the system would normally actuate switch actuators 56 and 58 to select a mode of operation, such as cooling or fan only and then also set the fan to a continuous running mode or to run according to a delay period when a cooling call has been satisfied by the system, for example. The mode selection switch actuator 58 could also, before or after setting the fan operating conditions, be actuated to select a maximum relative humidity, the actual amount of relative humidity then being set by one or the other of switch actuators 60 and 62. Preferably, the system 18 will automatically provide in the microcontroller 48 for a certain percent of humidity change above and below the humidity setpoint to prevent the system from cycling on and off too frequently. For example, the humidity would have to change more than 1% above or below the setpoint for the system to react to the humidity setpoint. Typically, when the system 18 is operating in a cooling mode of operation, humidity control would be automatically enabled. However, the thermostat controller 20 could be operable to allow the user to enable or disable humidity control.

Figure 4:
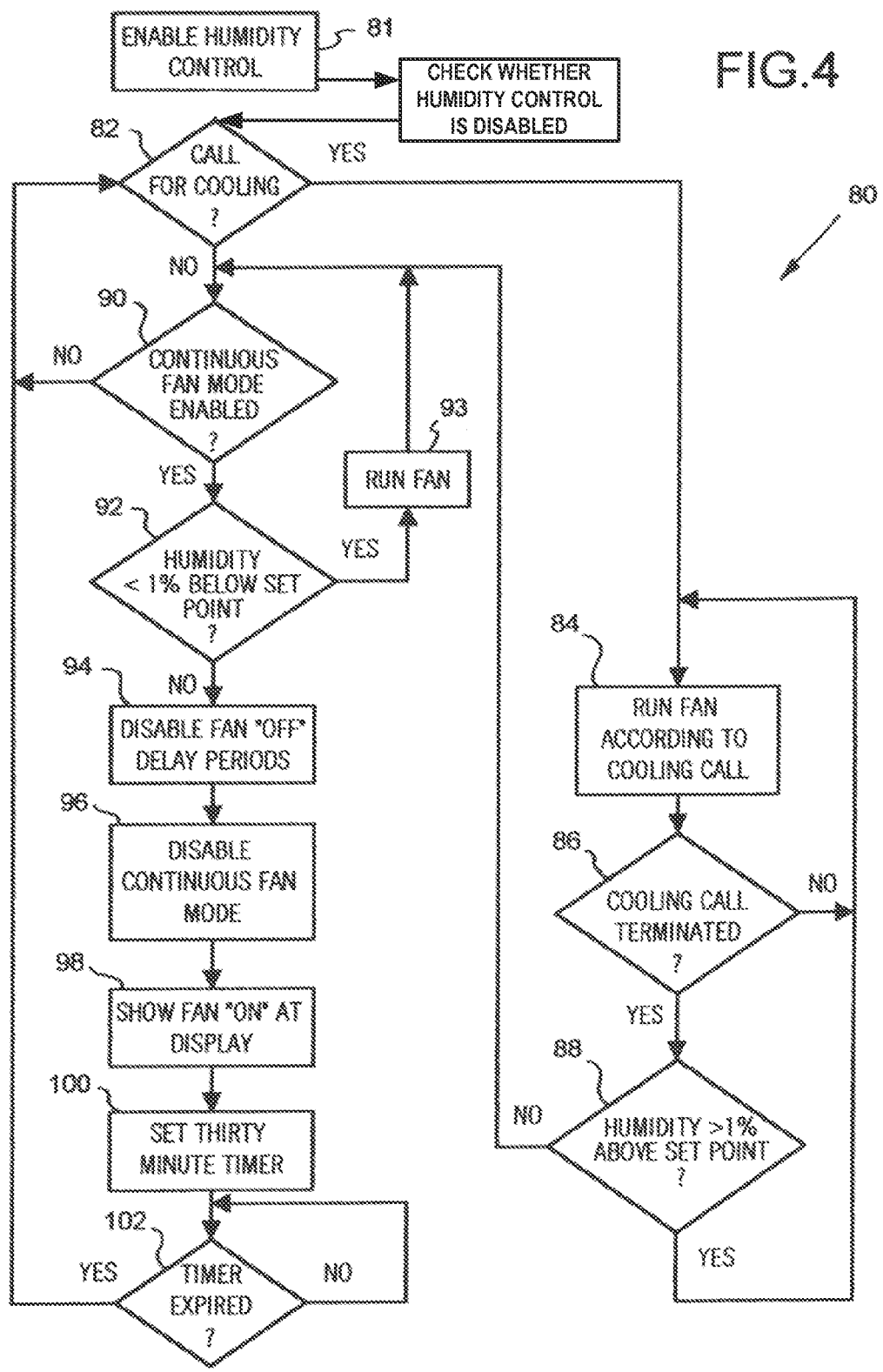
FIG. 4 is a flow diagram illustrating at least major steps in a method of the present invention.

Referring now to FIG. 4, there is illustrated a flow diagram of a process 80 for controlling humidity by operation or cessation of operation of the fan 32 dependent on the selected value of humidity set for the system 18. The flow diagram of FIG. 4 includes the step of enabling humidity control, as indicated at step 81. In response to a call for cooling at step 82, fan 32 would be controlled to run according to the cooling call, as indicated at step 84. The call for cooling step 82 is not dependent on enablement of humidity control, but responds to enablement of a cooling mode of operation of system 18. The process will query the system 18 to determine if the cooling call has been terminated at step 86. If the cooling call has been terminated, that is the temperature set on the thermostat controller 20 has been reached by operation of the system 18, the process proceeds to step 88 at which point the microcontroller 48 queries the sensor 26 to determine if the humidity is greater than 1% above the humidity setpoint. If the humidity sensed by sensor 26 in space 22 is greater than 1% above the setpoint value, the fan 32 is run according to the cooling call requirements and if this cooling call requirement has been satisfied fan operation is terminated.

However, if at step 88 the humidity sensed is not greater than 1% above the setpoint, the process would proceed to step 90. Step 90 is also reached early in the process if there was no call for cooling at step 82, as indicated in FIG. 4. If the continuous fan operating mode has been enabled at step 90, the process proceeds to step 92 wherein the microcontroller 48 queries the sensor 26 to determine if the sensed humidity is less than 1% below the setpoint for humidity, as determined by the system user. If such is the case, and the continuous fan mode has been enabled, the fan 32 is energized to run and circulate air through space 22, as indicated at step 93. If the humidity sensed is a value more than 1% below the setpoint, fan run-on or a fan off delay period would be disabled at step 94, thus requiring that the fan cease operating immediately once the cooling call is satisfied.

In the process illustrated in FIG. 4, if the humidity sensed in space 22 is a value greater than 1% below the humidity setpoint the fan off delay is disabled, and the continuous fan mode is disabled, as indicated at step 96, even though a user of the system 18 may have selected the continuous fan mode. If the continuous fan mode is disabled, the controller 20 could be programmed to cause display 50 to show the fan on at step 98 as indicated by indicia 64a, FIG. 2, to advise the user that they have selected the continuous fan mode, but the fan is not operating because of high relative humidity in space 22.

Still further, the process 80 desirably provides for setting a timer function, such as a thirty minute interval, as indicated at step 100, whereby upon expiration of the timer, the system 18 would initiate a repeat of the process beginning with step 82 and proceeding to steps 90, 92, possibly 93, 94, 96, 98 and 100. If the timer function has not expired, as part of the process flow indicated at step 102, the process continuously queries the timer function until the thirty minutes has elapsed. If the actual value of the humidity in the space 22 is less than 1% below the humidity setpoint, as indicated by step 92, the fan is allowed to continue to run at step 93 assuming that the continuous fan mode of operation has been enabled, as indicated at step 90. Of course, if the continuous fan operating mode has not been enabled at step 90, the process will continuously follow the loop indicated waiting for a call for cooling whereby the fan 32 will operate according to the requirements of the cooling call as indicated at step 84.

In accordance with the process 80 illustrated in FIG. 4, the fan 32 will not be operated to reintroduce more humidity into the space 22 if the humidity sensed by sensor 26 is greater than the humidity setpoint plus an incremental value of 1% of the setpoint. However, the system 18 will operate the fan 32 if the total sensed humidity value is less than the setpoint value minus an incremental value of 1% of the setpoint. In this way, the user is not able to operate the fan 32 in a continuous mode, nor would a programmed procedure be enabled which called for operating the fan for a certain time delay after completing of the cooling call, if the humidity is above a desired value, both of which events are likely to reintroduce moisture into the air circulating within the space 22. Accordingly, maximization of the indoor air quality, normally benefiting from continuous fan operation is provided by the process and system of the present invention.

Although preferred embodiments of a method and system, respectively, in accordance with the invention have been described in detail herein, those skilled in the art will recognize that various substitutions and modifications may be made without departing from the scope and sprit of the appended claims.

What is claimed is:

1. A method of controlling an HVAC system, comprising:
   allowing a user of a thermostat controller of the HVAC system to select between enabling and disabling a humidity control for use in a cooling mode of the HVAC system that selectively operates a compressor in response to a call for cooling, wherein the disabling the humidity control comprises allowing the user to override an otherwise automatic enablement of the humidity control;
   Enabling the humidity control in response to the user selecting to enable the humidity control via the thermostat controller;
   operating a fan of the HVAC system according to an overridable user selectable fan control preference that, when not overridden by the humidity control, causes operation of the fan independent of a call for cooling of the HVAC system; and
   in response to enabling the humidity control, operating the humidity control to selectively override the overridable user selectable fan control preference that, but for being selectively overridden by the humidity control, causes operation of the fan independent of the call for cooling; wherein operating the humidity control comprises after selectively overriding the overridable user selectable fan control preference, discontinuing the overriding of the overridable user selectable fan control preference; and wherein the discontinuing the overriding of the overridable user selectable fan control preference is conditioned on a comparison between a humidity setpoint selected via the thermostat controller and a sensed humidity.

2. The method of claim 1, further comprising:
   operating the thermostat controller to advise the user that the user prefers the overridable user selectable fan control preference, but the fan is not operating because of a high relative humidity.

3. The method of claim 1, wherein the overridable user selectable fan control preference, when selected by a user, is an indication that a user prefers to continuously run the fan during periods of time that the compressor is not operating.

4. The method of claim 1, further comprising:
   operating the HVAC system in response to a call for cooling while the humidity control is enabled;
   operating the humidity control to compare a humidity setpoint to a sensed humidity; and
   after operating the HVAC system in response to the call for cooling while the humidity control is enabled and in response to the comparison of the humidity setpoint to the sensed humidity, at least one of overriding the operation of the fan according to the overridable user selectable fan control preference and resuming operation of the fan according to the overridable user selectable fan control preference.

5. The method of claim 4, further comprising:
   during the at least one of overriding and resuming operation of the fan according to the overridable user selectable fan control preference in response to the comparison between the humidity setpoint and the sensed humidity, operating the thermostat controller to select operation of the HVAC system with the humidity control disabled;
   wherein the operating the thermostat controller to select operation of the HVAC system with the humidity control disabled discontinues controlling operation of the fan in response to the comparison between the humidity setpoint and the sensed humidity.

\* \* \* \* \*